J. F. ISBELL.
HEAD MOTION FOR CONCENTRATORS.
APPLICATION FILED SEPT. 8, 1913.
1,163,345.
Patented Dec. 7, 1915.
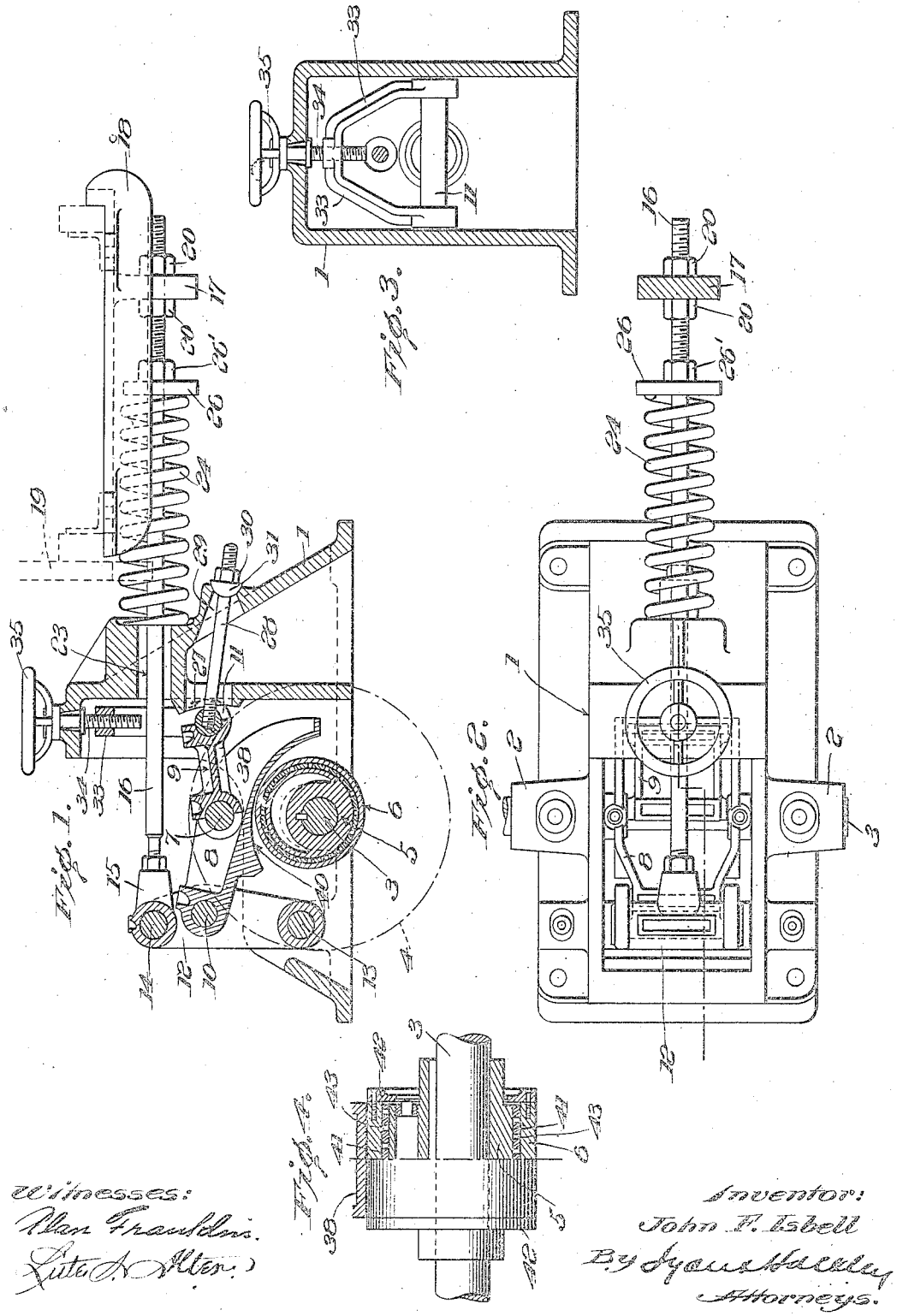
Witnesses:
Inventor:
John F. Isbell
By his Attorneys

UNITED STATES PATENT OFFICE.

JOHN F. ISBELL, OF LOS ANGELES, CALIFORNIA, ASSIGNOR TO ORREN ALLEN, OF DENVER, COLORADO.

HEAD-MOTION FOR CONCENTRATORS.

1,163,345. Specification of Letters Patent. Patented Dec. 7, 1915.

Application filed September 8, 1913. Serial No. 788,685.

*To all whom it may concern:*

Be it known that I, JOHN F. ISBELL, a citizen of the United States, residing at Los Angeles, in the county of Los Angeles and State of California, have invented a new and useful Head-Motion for Concentrators, of which the following is a specification.

The main object of the present invention is to provide a head motion in which the differentiation of the advancing and return strokes may be regulated or varied with great accuracy and throughout a wide range.

Other objects of the invention will appear hereinafter.

The accompanying drawings illustrate an embodiment of the invention, and referring thereto: Figure 1 is a vertical section of the head motion. Fig. 2 is a plan view thereof, the bracket for attachment to the concentrator table being shown in section. Fig. 3 is a transverse sectional view through the head motion taken on a vertical plane passing longitudinally through the adjusting screw to be hereinafter described. Fig. 4 is a longitudinal section of the eccentric and its bearing ring and the bearing portion of the toggle member operated thereby.

The head motion is mounted in a suitable base or frame 1 provided with means for attachment to a suitable fixed support and with bearings 2 for the operating shaft 3 of the head motion. Said shaft 3 is provided with driving means such as a pulley, indicated in broken lines at 4 in Fig. 1. A cam or eccentric 5 is provided on the shaft 3 and a sleeve or collar 6 is rotatively mounted on and extends around the eccentric 5 and engages an arm or lever 8 forming one member of a toggle, the other member of which is formed by a link 9, said arm 8 and link 9 being connected together by a knuckle joint or pivot shaft 7 and being mounted at their outer ends on suitable bearings 10 and 11. Bearing 11 is fixed in the operation of the machine and serves as an abutment for the toggle. Bearing 10 consists of a shaft on a rocking frame 12 which is mounted on a fixed shaft or bearing 13 at its lower end, and is connected by pivot or shaft 14 at its upper end to a head 15 connected with a bar 16 having connection with a bracket 17 depending from the plate 18 which is rigidly attached to the table, indicated in dotted lines at 19. The bar 16 screws at one end into the head 15 and is provided at its other end with a screw portion engaging with nuts 20 bearing on opposite faces of the bracket 17 so that by adjustment of nuts 20, the longitudinal position of the table relative to the head motion may be adjusted. The bar 16 extends through an opening 23 in the head motion frame 1 and a spring 24 engages with a seat 25 adjacent said opening and with a collar 26 held by a nut 26' screwing on the bar 16, said spring tending to draw the bar 16 and rocking lever or frame 12 so as to bend the toggle 8, 9, downwardly. The fixed bearing for the toggle comprises a shaft 11 which engages with a bearing face 27 on the frame 1 and is held in position by a tightening screw 28 fastened to the shaft 11 and extending through an opening 29 in the frame 1, said screw 28 being provided with a nut 30 which presses a spherical collar 31 into tight contact with a bearing or seat around the opening 29, so as to draw the shaft 11 tightly against its bearing 27. The stroke of the machine depends on the vertical position of this abutment shaft 11, this vertical position being determined by the adjustment of said shaft by means of a yoke 33 connected to said shaft and engaged by a screw 34 which is rotatably mounted in the frame 1 and provided with operating means 35, the mounting of the screw 34 being sufficiently loose to permit of the slight longitudinal motion of the yoke 33 and shaft 11 due to the curvature of the abutment face 27 such face being approximately concentric with the center of the knuckle shaft 7 of the toggle. The lever 8 is extended beyond the knuckle shaft 7 of the toggle, as shown at 38, and a bearing face 40 is formed on the lever and on its extension 38 to engage the ring or collar 6 on the eccentric so that as said ring or collar rises and falls on the rotary motion of the eccentric, the lever 8 will be raised and lowered and the toggle 8, 9, will be operated to produce a longitudinal motion of the bar 16.

In order to minimize the wear and friction on the eccentric 5, and ring 6, the said ring is provided with a bearing sleeve 41 of bronze or other suitable metal, retained in place by flanges 42 and provided with perforations 43 through which suitable lubricant such as graphite composition, placed between the sleeve and the ring may find its way to the bearing surface of the eccentric.

The operation is as follows: Assuming the shaft to be rotated in a clockwise direction, as indicated by the arrow in Fig. 1, and the eccentric to be in its lowermost position, the rotation of the shaft will cause the eccentric to rise and the ring or collar 6 on the eccentric to bear on the bearing face 40 and raise the toggle member 8. In this movement of the member 8 the link 9 swings on its fixed abutment shaft 11, so that the toggle, consisting of the members 8, 9, straightens out and turns the rocking frame 12 outwardly, so as to draw the bar 16 against the action of the spring 24 and move the table toward the head end thereof, this motion being arrested when the toggle is nearly straightened, so that the arrest of this motion and the starting on the return motion are slow and easy. As the eccentric 5 moves down, the toggle member is lowered and the motion of the rocking frame 12 is reversed, this motion being arrested when the toggle is in lowermost position, and in this position a comparatively small motion of the toggle produces a considerable motion of the rocking frame 12, so that the reversal of motion at this end of the stroke is sharp and quick. The extent to which the lever 8 will be raised for a given upward movement of the eccentric depends upon the location of the point of contact between the bearing ring 6 and the bearing face 40 of the lever 8. The farther this point of contact is from the pivotal bearing 10 of the lever 8, the less will be the swinging movement of the lever for a given rise of eccentric and the location of this point of contact depends upon the curvature of the bearing face 40, so that by suitably shaping this face, I may increase or decrease the action or leverage on the lever 8. Furthermore, this point of contact shifts along this curved face 40 in the operation of the eccentric, so that it is farther from the pivotal center of the member 8 in the descending than it is in the ascending motion of the eccentric. In consequence of this, the motion of the toggle and of the table connected thereto is more rapid in the return stroke of the table than it is in the forward stroke, thereby increasing the differential effect and the forward travel of the ore. By raising or lowering the abutment shaft 11 by means of the adjustment of its controlling screw 34 and yoke 33, the member 9 of the toggle may be brought more or less into line with the member 8 by any given position of the eccentric, so that the toggle action may be varied within considerable limits.

The bearing face 40 on the toggle member 8 is concavely curved so as to provide a better bearing on the bearing ring 6 and also to shift the point of contact more rapidly with change in position of the eccentric. In this shifting of the point of contact, the bearing ring 6 rolls on the bearing face 40, the only sliding movement being that which takes place within the said bearing ring due to rotation of the eccentric within said ring, and this sliding movement is rendered substantially frictionless by the antifriction sleeve 41.

What I claim is:

1. A head motion comprising a base, a shaft for the base, means to turn the shaft, an eccentric mounted on the shaft, toggle members pivoted together and operated by the eccentric, a yoke adjustably connected to the base, a shaft mounted on the yoke and engaging one of the toggle members and also engaging the base, a screw fixed to the yoke shaft and provided with a collar engaging the base, a nut screw threaded on said screw and seated against the collar, and a movable member connected to the other toggle member.

2. A head motion comprising a base having a curved seat, an eccentric rotatively mounted in the base, means to turn the eccentric, toggle members pivoted together, means connected to one of the toggle members to force the toggle pivot toward the eccentric, a shaft forming an abutment for the other toggle member and resting against and adjustable along the curved seat, and means to lock the shaft firmly against said curved seat.

3. A head motion comprising a base, an eccentric rotatively mounted on the base, means to turn the eccentric, a rocking frame pivoted to the base, a toggle member pivoted at one end to the rocking frame and provided with a downwardly curved bearing face extending from the opposite end of said toggle member toward the pivot of said toggle member, a second toggle member, a pivot connecting one end of the second toggle member to the first toggle member at a point between the ends of the first toggle member, an abutment for the opposite end of the second toggle member, and means to shift said abutment relative to a vertical plane passing through the axis of the eccentric.

In testimony whereof, I have hereunto set my hand at Telluride, Colorado, this 4th day of August, 1913.

JOHN F. ISBELL.

In presence of—
A. W. SEGERBERG,
M. F. BALLEW.